Figure 1:
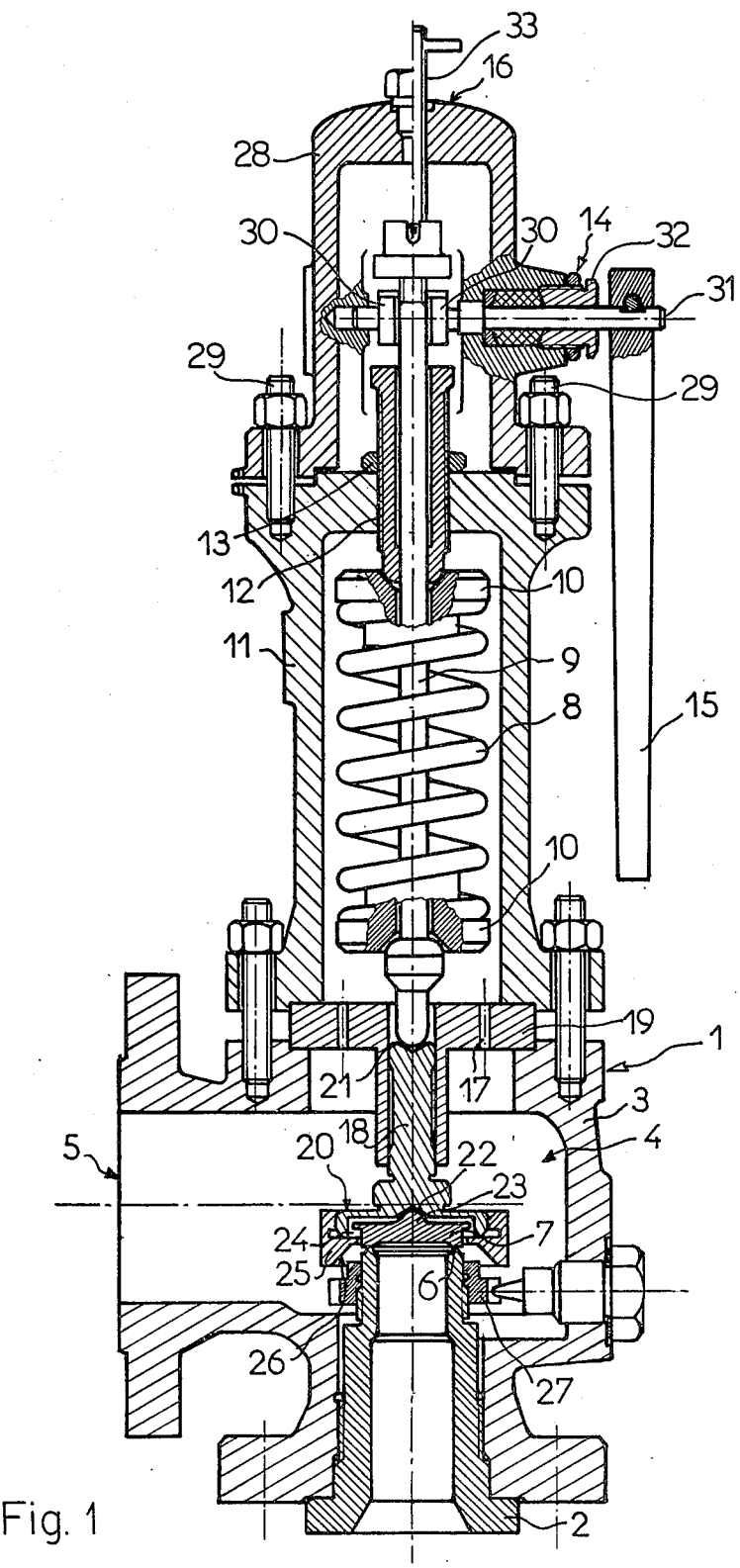

United States Patent [19]

Bayart et al.

[11] Patent Number: 4,480,660

[45] Date of Patent: Nov. 6, 1984

[54] SAFETY VALVE

[75] Inventors: Martin Bayart, Villeneuve D'Ascq; Bernard Grincourt, Lille; René Chabierski, Annoeullin, all of France

[73] Assignee: S.A. Etablissements SARASIN et Cie, Haubourdin, France

[21] Appl. No.: 400,961

[22] Filed: Jul. 22, 1982

[30] Foreign Application Priority Data

Apr. 7, 1982 [FR] France ............................... 82 06372

[51] Int. Cl.³ ............................................. F16K 17/30
[52] U.S. Cl. .................................. 137/478; 137/494; 137/522; 137/495; 251/261
[58] Field of Search ............... 137/475, 478, 476, 469, 137/470, 494, 495; 251/260, 261

[56] References Cited

U.S. PATENT DOCUMENTS

| | | | |
|---|---|---|---|
| 2,815,040 | 12/1957 | Smith | 137/469 |
| 3,411,530 | 11/1968 | Powell | 137/475 |
| 3,702,142 | 11/1972 | Richardson | 137/478 |
| 4,001,545 | 9/1961 | Ziege | 137/478 |
| 4,130,130 | 12/1978 | Stewart et al. | 137/475 |
| 4,418,714 | 12/1983 | Cullie | 137/478 |

FOREIGN PATENT DOCUMENTS 800637 8/1958 United Kingdom ............... 137/469

Primary Examiner—Martin P. Schwadron
Assistant Examiner—Stephen M. Hepperle
Attorney, Agent, or Firm—Robert E. Burns; Emmanuel J. Lobato; Bruce L. Adams

[57] ABSTRACT

A safety valve intended to limit the pressure of a fluid contained in a vessel to which the valve is connected by a nozzle closed off by a flap-valve pressed against its seat by a spring acting on a first side of the flap-valve. The valve has two operating states; either the flap-valve is closed when the fluid pressure in the vessel acting through the nozzle on the opposite or second side of the flap-valve is below a pre-determined value or the flap-valve is open allowing fluid from the vessel to escape via an escape chamber in the valve when the pressure in the vessel is above the pre-determined value. A casing surrounding the spring is connected with the escape chamber by calibrated holes whereby the pressures in the casing and chamber are equalized. In addition to the spring, fluid pressure in the chamber acts on the first face of the flap-valve. When the flap-valve is closed, the fluid pressure in the escape chamber and casing is low. Thus the flap-valve opens quickly when the fluid pressure in the vessel attains the pre-determined value. When the flap-valve is open the pressure in the escape chamber and thus in the casing is high assisting rapid closure of the flap-valve when the vessel pressure falls below the pre-determined value.

1 Claim, 1 Drawing Figure

SAFETY VALVE

The invention relates to a safety valve.

A particular application of the valve is for limiting the pressure of a fluid contained in a vessel, for example a boiler.

At present, safety valves are composed in particular of a nozzle which is connected to the vessel in which one wishes to limit the pressure. This nozzle is closed in the inoperative position by a flap-valve which is pressed against the nozzle through the intermediary of elastically yielding means such as a spring. When the pressure in the vessel exceeds a certain threshold, the force exerted by the spring is insufficient to keep the flap-valve pressed against the nozzle and therefore the flap-valve lifts thus allowing part of the fluid contained in the vessel to escape. This discharge of fluid makes it possible to limit the pressure in the vessel; then, when this pressure once more becomes less than the force exerted by the spring on the flap-valve, the latter once more closes off the nozzle and the valve returns to the closed position.

In order to minimise the dangers of transitory phenomena such as flapping of the flap-valve on the nozzle, special equipment is currently available, such as deflectors located on the flap-valve, which allow a clean opening of the valve. In fact it is important to provide a valve which is able to react very quickly in the case of a sudden pressure rise in the vessel to be protected.

But it is also advantageous to provide very rapid reclosure of the valve when the pressure in the vessel drops below the critical threshold. In fact, for example, if it is a question of protecting any cooling circuit, it is essential to reclose the valve in order to limit the escape of fluid under penalty of seeing the cooling circuit no longer operating with the serious consequences which this may involve.

Now, when the valve is in the open position, apart from the static pressure of the fluid present, in the vessel which escapes, the flap-valve is subject to the dynamic pressure of this fluid and thus reclosure of the valve may require a much greater force than the force necessary for containing solely the static pressure. In order to obviate this difficulty, so-called assisted valves exist, which comprise a jack which ensures reclosure of the flap-valve upon external excitation. However, on the one hand, it is necessary to stress that the reclosure is slow and that consequently it requires a fragile and expensive control device.

The main object of the present invention is to provide a safety valve which has a high operating speed both as regards opening and closure. It requires no external control device, which makes it particularly reliable.

Another object of the present invention is to provide a safety valve whereof the design minimises the dangers of seizing of the flap-valve. In fact, normally, safety valves are subjected to little stress, which may cause seizing of the mechanical parts which will be superficially oxidized for example, thus causing dimensional variations in the mechanical operating clearance.

Further aims and advantages of the present invention will become apparent from the ensuing description, which however is given solely by way of example and is not intended to limit the latter.

According to the invention there is provided a safety valve intended to limit the pressure of a fluid contained in a vessel, which has two operating states, on the one hand the closed position in which it isolates the fluid contained in the vessel and on the other hand an open position in which it allows the pressurized fluid contained in said vessel to escape, characterised in that said valve comprises means for operating in a clean manner, i.e. for minimising the time taken to pass from the closed position to the open position and vice versa.

The safety valve intended to limit the pressure of a fluid contained in a vessel to which it is connected and which has two operating states, on the one hand the closed position in which it isolates the vessel under pressure and on the other hand the open position when it allows the fluid contained in the vessel to escape at a pressure greater than a certain threshold, is characterised by the fact that it comprises means for operating in a clean manner, i.e. for minimising the time taken to pass from the closed position to the open position and vice versa.

The invention will now be further described, by way of example, with reference to the accompanying drawing in which:

FIG. 1 shows a preferred embodiment of the safety valve according to the invention, in elevation and in section.

The safety valve is intended to limit the pressure of a fluid contained in any vessel or circuit. The invention is more particularly suited to fluids of the gaseous type; however, it may also be extended to liquids.

FIG. 1 shows a safety valve 1 which is connected to a vessel (not shown) through the intermediary of a nozzle 2. This nozzle 2 opens out inside the body 3 of the valve in an escape chamber 4. This escape chamber 4 is generally open to the outside at 5, however, in the case of toxic fluids or more generally fluids which one wishes to recover, it will be possible to pipe the fluid coming from the vessel in a conduit which will be flange-mounted on the opening 5 for example.

At its end the nozzle 2 will comprise a seat 6 against which a flap-valve 7 will bear, the latter being pressed against the seat 6 through the intermediary of spring means 8.

Thus, when the valve 1 is in the closed position, the flap-valve 7 will be pressed in a fluid-tight manner against the seat 6 through the intermediary of spring means 8. On the other hand, when the pressure in the vessel exceeds a certain threshold, the force which this pressure exerts on the flap-valve 7 will become greater than the force applied by the spring means 8 in counter-reaction on the flap-valve 7. Thus, the flap-valve will lift, which will cause the escape of pressurised fluid contained in the vessel into the escape chamber 4 then the discharge of the said fluid through the opening 5 towards the outside or a recovery conduit.

In this way, depending on the pressure exerted by the spring means 8 on the flap-valve 7, it will be possible to limit the pressure in the vessel to a predetermined threshold.

According to one possible embodiment of the spring means 8, the latter will be constituted by a spring, for example of the helical type which will exert its action on a central shaft 9 through the intermediary of two cups 10, one of which is integral with the central shaft 9.

The spring will be located for example in a casing 11 fixed at its lower end to the body 3 of the valve. Moreover, a calibration ring 12 will be screwed to the upper part of the casing 11 and will exert a force on the upper cup 10 in order to place the spring 8 under compression.

The central shaft 9 will be able to slide freely inside the calibration ring 12.

In this way, by adjusting the degree of penetration of the calibration ring 12 into the casing 11, by rotation of the ring, it will be possible to compress the spring 8 to a greater or lesser extent and consequently to exert a greater or lesser force on the flap-valve 7. Consequently, the limitation of the pressure contained in the vessel will be adjusted by regulating the calibrating ring 12. A lock-nut 13 screwed onto the calibration ring 12 will make it possible to immobilize the said ring in a desired position which will correspond to the desired limit pressure for opening the valve.

Moreover, a cam mechanism 14 in a second casing of fixed above the casing 11, by bolts 29 makes it possible to force the opening of the valve by lifting the flap-valve by means of a control arm 15. The cam mechanism comprises cams 30 on a transverse spindle 31 engaging an abutment on the shaft 9. A gland 32 on the spindle 31 assures that the second casing 28 is closed.

Furthermore, at its upper end, the valve will be equipped with a device 16 for locking the valve in the closed position. In the preferred embodiment of the invention, the latter device is a screwthreaded rod 33 which is screwed into the upper end of the second casing 28 and which presses on the central shaft 9 in order to prevent the latter from being able to rise and similarly with the flap-valve 7.

The safety valve which has two operating states, on the one hand the closed position in which it isolates the vessel containing the fluid and on the other hand the open position in which it allows the fluid contained in the vessel to escape, comprises means which enable it to operate in a clean manner, i.e. to minimise the time taken for the passage from the closed position to the open position and vice versa. In fact, the valve has a very short opening and closing time.

The speed of the closure of the valve will be obtained by the intermediary of means which will make it possible to increase the force exerted by the spring means on the flap-valve, by an additional force when the latter is in the open position. In this way, the opening of the flap-valve will not be affected by this additional force, on the other hand, at the time of closure, since the force exerted on the flap-valve is greater, the valve will reclose in a very clean manner.

In one preferred embodiment of the safety valve, the additional force will be exerted on the flap-valve with a certain delay after the opening of the latter. The means is constituted by one or more calibrated holes 17 which will connect the closed inner volume of the casing 11 and the escape chamber 4.

In this way, when the flap-valve is in the closed position, the escape chamber is at low pressure which will be referred to as inoperative pressure. Through the intermediary of the calibrated holes 17, the inner volume of the casing 11 will also be placed under this inoperative pressure. Consequently, the pressure which will be exerted in the vicinity of the upper part of the flap-valve-support 18 sliding in the flap-valve guide 19 and against which the central shaft 9 bears, will be the inoperative pressure. Thus, the force exerted on the flap-valve will on the one hand be the force of the spring means 8 and on the other hand the inoperative pressure.

On the other hand, when the flap-valve is in the open position, the fluid coming from the vessel escapes into the escape chamber 4 and is discharged through the opening 5. An excess pressure thus prevails in the escape chamber 4, which results in a pressure greater than the inoperative pressure, this being referred to as the operating pressure. Through the intermediary of the calibrated holes 17, the inner volume of the casing 11 sees its pressure increased in order to be in equilibrium with the so-called operating pressure. When this state of equilibrium is reached, the pressure which is exerted on the upper part of the flap-valve support 18 is equal to the operating pressure. Consequently, the total pressure exerted on the flap-valve 7 is the sum of the force exerted by the spring means to which the operating pressure is added.

The additional force resulting from the increase in pressure in the volume of the casing 11 promotes the closure of the flap-valve without in any way hindering opening, since this additional force is created after the opening of the valve.

Depending on the diameter of the holes 17, it is possible to extend the time necessary for achieving equilibrium of the pressures between the escape chamber 4 and the inner volume of the casing 11. For satisfactory operation of the safety valve, it is necessary that the equilibrium of pressures is achieved largely after the complete opening of the flap-valve.

It is possible to increase the preceding effect by applying the pressure of the inner volume of the casing 11 not solely to the upper part of the flap-valve support 18 which receives the central shaft 9, but to the entire upper surface 20 of the flap-valve support 18. For this, one places a fluid-tight membrane (not shown) on the periphery of the upper surface 20 of the flap-valve support 18 and one connects this membrane in its upper part of the flap-valve guide 19. Thus, the membrane prevents the upper surface 20 of the flap-valve support 18 from being influenced by the pressure which prevails in the escape chamber 4, but subjects this upper surface 20 directly to the pressure which prevails in the inner volume of the casing 11.

Depending on the dimensions of the upper surface 20 surrounded by the membrane, it is possible to modulate the additional force which will be exerted after the opening of the flap-valve 7.

According to a preferred embodiment of the safety valve, the flap-valve support 18 will have a considerable mechanical clearance with respect to the flap-valve guide 19. Good results have been obtained using a mechanical clearance of the order of several tenths of a millimeter.

The presence of this clearance on the one hand ensures minimum friction, which promotes the operating speed of the valve and on the other hand, prevents any seizing of its operation. In fact, even if a certain oxidation on the surface of the parts occurs, which could result from infrequent use, this dimensional variation of the parts due to oxidation will have no effect on the sliding of the flap-valve support 18 and in particular will prevent any seizing both in the closed as well as in the open position.

The upper part of the flap-valve support 18 will comprise a bearing region 21 on which the force imposed by the central shaft 9 will be exerted. In fact it is preferable to dissociate the flap-valve support 18 from the central shaft 9, since the production of a single piece would have limited the possibilities of movement of the flap-valve support 18 in the flap-valve guide 19. This would have been unfavourable from the point of view of seizing.

In a preferred embodiment, the bearing region 21 will be formed by a conical cavity in the vicinity of the flap-valve support 18 and by a rounded end of the central shaft 9. In this way, a certain movement of the flap-valve support 18 will be allowed and at the same time centering of the central shaft 9 on the flap-valve support will be achieved. The flap-valve support 18 will comprise a bearing cavity 22 at its lower end on which will bear a ball 23 provided on the upper face of the flap-valve. In this way, a certain angular movement of the flap-valve 7 with respect to the flap-valve support 18 will be possible. The flap-valve 7 will be trapped in a housing 24 by means of an attached ring 25. In this way, a certain latitude of adaptation of the flap-valve will be allowed in order that the latter bears on the seat 6, however, the flap-valve will remain trapped by the flap-valve support 18.

The ring 25 will also comprise a deflector 26 on its lower part. The function of this deflector 26 is to modify the orientation of the flow of fluid escaping through the nozzle, when the valve is in the open position and thus to utilize the dynamic force of the flow of fluid in order to increase the opening speed of the valve.

Furthermore, in combination with a ring 27 fitted on the nozzle 2, the deflector 26 will make it possible to form an auxiliary escape chamber on the periphery of the flap-valve, in order to improve the clean opening of the valve.

In a preferred embodiment of the flap-valve support 18 and of the flap-valve guide 19, the latter will be made from materials of different hardness.

What is claimed is:

1. A safety valve for limiting the pressure of a fluid contained in a vessel comprising:
   a hollow body defining an escape chamber and having first and second openings opposite one another and a third opening at one side between said first and second openings and constituting a fluid discharge opening,
   a nozzle secured in said first opening of said body and adapted to be connected with said vessel, said nozzle having an inner end portion extending into said escape chamber and terminating in a valve seat,
   a valve guide in said second opening and comprising a disc portion clamped between said body and an inner end of an elongate first casing secured to said body and a central tubular portion directed toward and aligned with said nozzle,
   a valve support comprising a stem portion slidably received in said tubular portion of said valve guide and a cup-shaped head portion at the inner end of said stem portion and facing said nozzle,
   a flap valve tiltably retained in said head portion of said valve support and adapted to seat on said valve seat at the inner end of said nozzle,
   a compression spring in said first casing surrounding a shaft aligned with said stem portion of said valve support and having a lower end engaging said stem portion and an upper end extending out through a threaded central opening in an outer end wall of said first casing,
   said spring being compressed between a first cup bearing on a shoulder spaced from the lower end of said shaft and a second cup bearing on an inner end of said tension-adjusting sleeve, said sleeve being rotatable to adjust the tension of said spring,
   a second casing removably secured on the outer end of said first casing and having a bore into which an upper end portion of said shaft extends,
   a rotatable spindle extending transversely of said second casing and having a projecting end portion extending out through a wall of said second casing, handle means on said projecting end portion of said transverse spindle for manually rotating said spindle, and cam means on said transverse spindle engageable with abutment means on said shaft to lift said shaft upon rotation of said transverse spindle to open said valve,
   the upper end of said stem portion of said valve support teminating below the upper end of said tubular portion of said valve guide and said shaft having a lower end portion extending into said tubular portion of said valve guide and having a rounded lower end engaging the upper end of said stem portion of said valve support, said lower end portion of said shaft being of smaller cross section than said stem portion, whereby fluid pressure in said first casing is applied to the upper end of said stem portion of said valve support in said tubular portion of said valve guide, said disc portion of said valve guide having at least one small calibrated hole therethrough to permit attenuated flow of fluid from said escape chamber to the interior of said first casing, whereby an increase of pressure in said escape chamber upon the opening of said valve upon occurence of excess pressure in said vessel will be transmitted to the interior of said first casing with a delay and will be applied to the upper end of said stem portion of said valve support in said tubular portion of said valve guide to supplement the force of said spring to close said valve upon a predetermined drop of pressure in said vessel a screw threaded rod extending through a tapped hole in the outer end of said second casing and engageable with said shaft to lock said valve in the closed position when said rod is screwed in, and means for sealing the entrance of said rotatable spindle into said second casing, whereby said second casing is closed.

* * * * *